(12) United States Patent
Fultz et al.

(10) Patent No.: US 7,175,240 B2
(45) Date of Patent: Feb. 13, 2007

(54) REVOLVING ORNAMENTATION FOR WHEEL

(76) Inventors: Karl Anthony Fultz, 15363 Artesian St., Detroit, MI (US) 48223; James Oliver Price, Jr., 4400 Harvard Rd., Detroit, MI (US) 48224

( * ) Notice: Subject to any disclaimer, the term of this patent is extended or adjusted under 35 U.S.C. 154(b) by 56 days.

(21) Appl. No.: 10/936,870

(22) Filed: Sep. 9, 2004

(65) Prior Publication Data
US 2006/0049685 A1    Mar. 9, 2006

(51) Int. Cl.
*B60B 7/20* (2006.01)

(52) U.S. Cl. ................... 301/37.25; 301/37.41
(58) Field of Classification Search .......... 301/37.101, 301/37.102, 37.25, 37.41, 110.5; 280/217; 310/67 A; 40/587
See application file for complete search history.

(56) References Cited

U.S. PATENT DOCUMENTS

| 639,567 | A | * | 12/1899 | Henderson | 280/217 |
|---|---|---|---|---|---|
| 2,762,469 | A | * | 9/1956 | George | 188/264 W |
| 3,155,430 | A | * | 11/1964 | Schindler | 301/37.25 |
| 3,548,185 | A | * | 12/1970 | Hall | 362/192 |
| 4,121,851 | A | * | 10/1978 | Finkenbiner | 280/288.4 |
| 4,567,973 | A | | 2/1986 | Butz | |
| 4,615,423 | A | | 10/1986 | Klauke et al. | |
| 4,844,552 | A | | 7/1989 | Tsygankov et al. | |
| 6,045,195 | A | * | 4/2000 | Okamoto | 301/37.376 |
| 6,556,370 | B1 | | 4/2003 | Fowlkes | |
| 6,663,187 | B2 | | 12/2003 | Fitzgerald | |
| 6,702,396 | B1 | | 3/2004 | Wang | |
| 6,741,428 | B1 | | 5/2004 | Oveyssi | |
| 6,899,400 | B1 | * | 5/2005 | Cook | 301/37.25 |
| 6,942,303 | B2 | * | 9/2005 | Smith et al. | 301/37.25 |
| 6,981,749 | B2 | * | 1/2006 | Cavazos et al. | 301/37.25 |
| 2002/0036426 | A1 | | 3/2002 | Fowlkes | |
| 2004/0075332 | A1 | | 4/2004 | Good | |

* cited by examiner

*Primary Examiner*—Russell D. Stormer
(74) *Attorney, Agent, or Firm*—Butzel Long

(57) ABSTRACT

Ornamentations for wheel assemblies that are rotatably mounted on the hub assemblies of the wheel assemblies and configured to produce a variety of visual and/or audible effects. The ornamentations develop a spinning motion as the wheels rotate and remain spinning for a period of time after the rotation of the wheels is stopped. The ornamentations are generally disc shaped and can include light and/or sound generating elements. The ornamentations can be used in conjunction with spoked wheels such as bicycle wheels.

20 Claims, 8 Drawing Sheets

REVOLVING ORNAMENTATION FOR WHEEL

TECHNICAL FIELD

The present invention relates vehicle wheels that are rotatably mounted on axles. More particularly, the present invention is directed to ornamentations for vehicle wheel which ornamentations are mounted about the wheel axles for free rotation thereabout.

BACKGROUND ART

For many years children and young adults have been decorating the wheels of bicycles using all sorts of objects. For example decorative tubes can be fit over the spokes of a bicycle wheel and sized so that they remain radially fixed in position or allowed to slide along the spokes. Bicycle wheels can also be decorated by weaving strips of material such as crepe-paper through the spokes or weaving lengths of other material such as yard, string, etc. through the spokes. It is also known to provide small plastic decorations that clip to one or more spokes of a bicycle wheel.

In addition to decorating bicycle wheels it is also known to attach noise making devices to bicycles in such a manner that the noise makers are engaged by the spokes of a rotating bicycle wheel and thereby make "clicking" noise. An example of such a noise maker is a flap that can be attached to the front fork or rear frame of a bicycle and stuck by the spokes of a rotating wheel. A simple example of such a flap is a card that is clipped to the front fork or rear frame of a bicycle by a clothes pin. Another example of a noise maker is a balloon that is placed between the front fork or rear frame of a bicycle and the adjacent spokes of a wheel.

Other ways that children or young adults decorate the wheels of bicycles is by sliding thin, e.g., paper decorative discs between the spokes of a bicycle wheel so that such discs are centered over the wheel axles and rotate with the wheel hubs and spokes.

It is also known to attach reflectors onto the spokes of bicycle wheels and to attach battery-powered lights to the valve stems of bicycle wheels.

The present invention provides for wheel ornamentations which are attached to the hub of a wheel assembly in such a manner that the ornamentations are free to rotate with respect to the wheel hub whereby visual motion effects and/or sound effects can be realized.

DISCLOSURE OF THE INVENTION

According to various features, characteristics and embodiments of the present invention which will become apparent as the description thereof proceeds, the present invention provides a wheel assembly that includes:

a hub assembly including a single axle that extends therethrough;

a rim mounted on the hub assembly and having a diameter; and at least one ornamentation rotatably mounted on the hub assembly, said at least one ornamentation having a diameter which is smaller than the diameter of the rim.

The at least one ornamentation comprises a disc which may be flat or three-dimensional and may have a substantially circular shape of any non-circular shape.

The ornamentation can include a plurality of cut-out portions formed therein and light generating and/or sound generating elements which can be removable or replaceable or integrally formed therein or thereon.

In some embodiments, two or more ornamentations can be used in conjunction with a single wheel assembly.

The wheel assembly can include a plurality of spokes and the ornamentation can be located intermediate the plurality of spokes.

The wheel assembly can comprise a rear or front bicycle wheel.

The ornamentation can comprise artwork or any desirable finish and can be made from plastic materials, metals and metal alloys, paper, fiberglass, composites, laminates, wood and combinations thereof.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
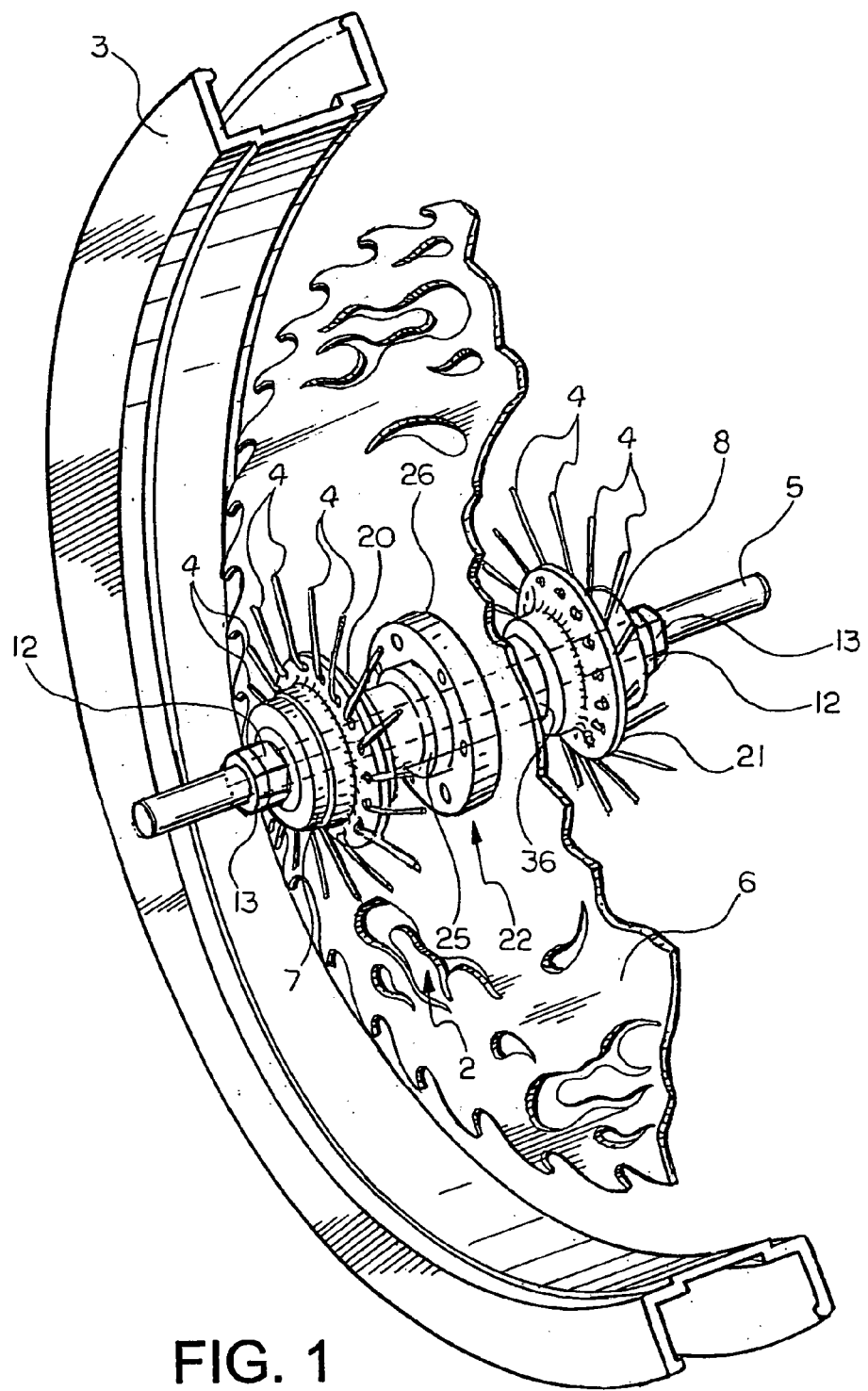
FIG. 1 is a perspective view of a wheel assembly according to one embodiment of the present invention.

The present invention is directed to ornamentations for vehicle wheels which ornamentations are mounted about the wheel axles for free rotation thereabout. The ornamentations of the present invention can generally be used in conjunction with any type of wheel that is mounted on an axle for rotation thereabout including, but not limited to, bicycle front and rear wheels, tricycle front and rear wheels, motorcycle front and rear wheels, wheel chair wheels, cart wheels, and other types of spoked-wheel assemblies or axle-mounted wheel assemblies.

The ornamentations of the present invention are configured and designed to provide a variety of visual and/or sound or audible effects. The visual effects include design patterns, shape patterns, kinetic assemblies and/or features, color and/or light patterns, and combinations thereof. The sound effects include configurations that are air pressure actuated, such as whistle structures, electric sound generators, removable air pressure sound generators, and combinations thereof.

The ornamentations of the present invention are designed and configured to be secured to the hub of a wheel that is rotatably mounted on an axle. As used herein, reference to a wheel hub encompasses a hub assembly since most wheel hubs comprise several component elements. The terms wheel hub(s) and hub assembly/assemblies are used interchangeably herein. The ornamentations are "secured" or mounded on wheel hubs in such a manner as to be rotatable about the hubs. In the case of a spoked-wheel assembly that includes a hub, the wheel ornamentations of the present invention are mounted on the hub between the set of spokes on either side of the wheel. Alternatively, the wheel ornamentations of the present invention can be mounted on a portion of the wheel hub so that the ornamentations extend outward from one or both sets of spokes. In further embodiments, multiple wheel ornamentations according to the present invention can be provide between the sets of spokes and/or outside one or both of the sets of spokes.

The wheel ornamentations of the present invention are rotatable mounted or coupled to wheel hubs so that as the wheels and wheel hubs rotate, the wheel ornamentations begin to rotate about the wheel hubs due to forces such as friction, aerodynamic forces, centrifugal force, inertia, etc. Because the wheel ornamentations are rotatably mounted or coupled to wheel hubs, when the wheels and wheel hubs slow down or stop rotating completely, the wheel ornamentations of the present invention will continue to rotate about the wheel hubs due to inertia. As a result, the wheel ornamentations will rotate when the wheels stop rotating or will rotate at different speeds than the wheels when the rotation of the wheels slows down (or speeds up).

One of the visual effects of the present invention includes an illusion that the wheels or at least a portion thereof (i.e. the wheel ornamentations) are rotating when the vehicle to which the wheels are attached is stationary, i.e. comes to a stop. This illusion can be enhanced by the configuration, shape, color and/or design of the wheel ornamentations and can be further enhanced by including two or more wheel ornamentations that are independently rotatable on the wheel hubs.

As will become apparent from the description of the invention presented in more detail below, the wheel ornamentations of the present invention can be made from a variety of materials such as plastic materials, metals and metal alloys, paper, fiberglass, composites, laminates, wood, etc. The wheel ornamentations be transparent, translucent, opaque, solid, perforated in any desired pattern, unitary, multi-component, flat, concave, convex, have complex three-dimensional faces, circular, square, polygonal, star-shaped, propeller-shaped, blade-shaped or have any geometric, symbol or compound or complex geometry desired.

The wheel ornamentations of the present invention can be disposable, removable, replaceable, reconfigured or customized by attaching thereto different artwork such as stickers or decals, coupling different components including kinetic components that have moving parts, noise making or noise generating elements, light generating components, or by removing or interchanging such objects.

Figure 2:
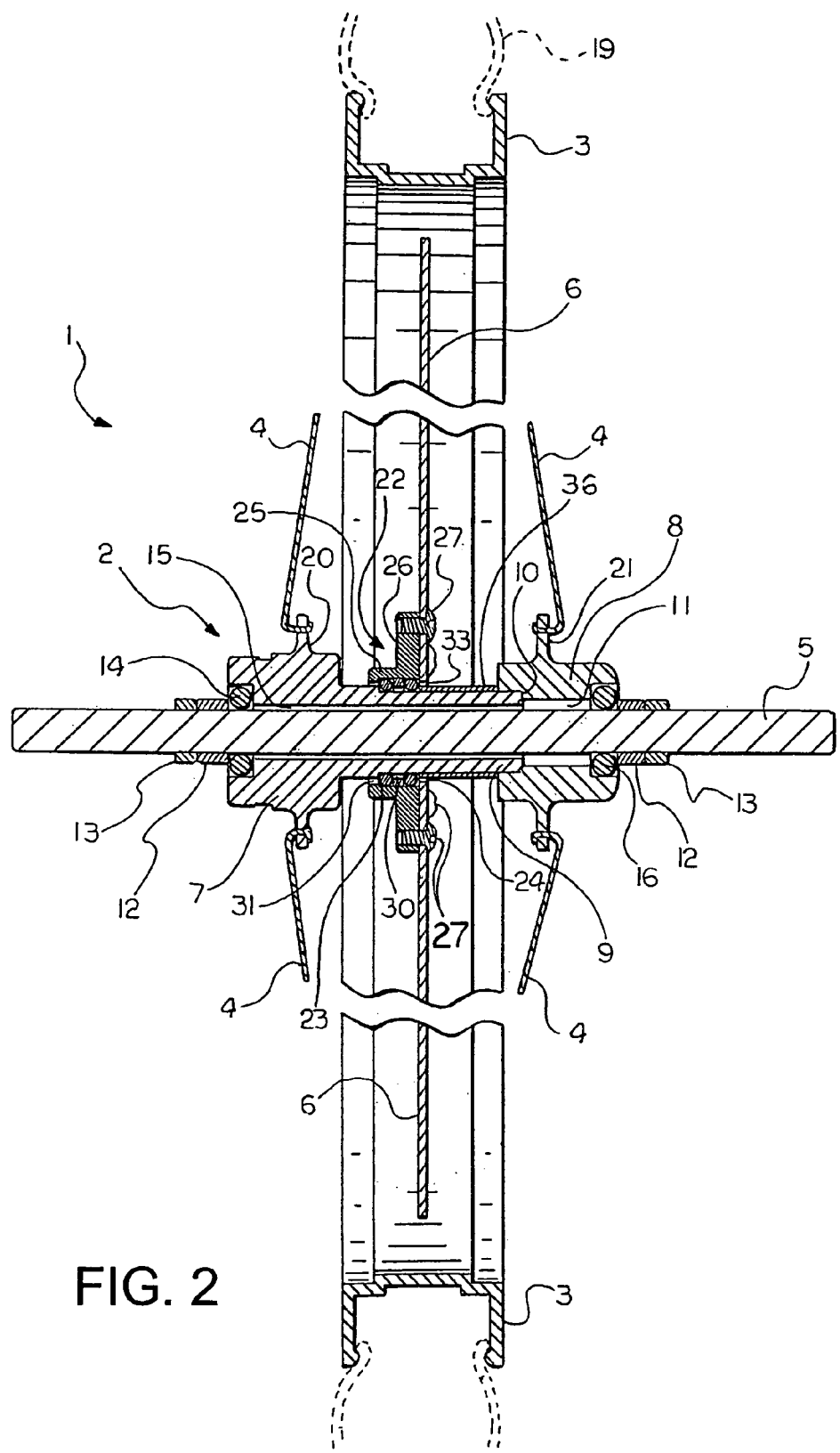
FIG. 2 is a cross-sectional side view of a wheel assembly according to one embodiment of the present invention.
Figure 3:
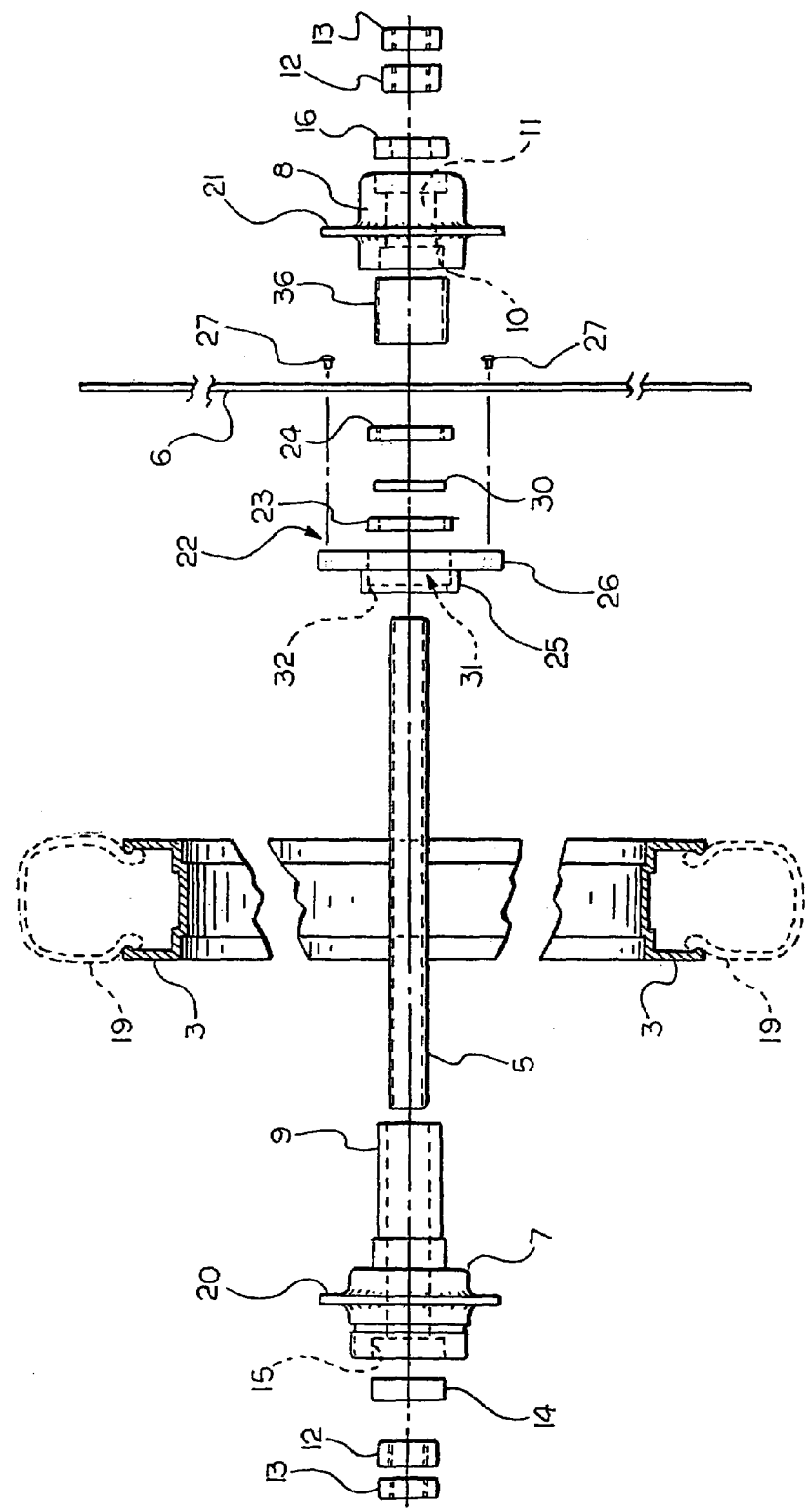
FIG. 3 is an exploded view of the wheel assembly of FIG. 2.

The present invention will be described with reference to bicycle wheels that are depicted in FIGS. 1–3. It is to be understood from the above description that the present invention is not limited for use with only bicycle wheels. The wheel ornamentations of the present invention can be used in conjunction with any type of spoked-wheel assembly or axle-mounted wheel assembly.

FIG. 1 is a perspective view of a wheel assembly according to one embodiment of the present invention. The wheel assembly 1 depicted in FIG. 1 includes a hub assembly 2 and a rim 3 that is coupled to the hub assembly 2 by a plurality of spokes 4 in a known manner. The hub assembly 2 includes an axle 5 that extends out from both sides of the hub assembly 2. The ends of the axle 5 are used to mount the wheel assembly 1 on either the front fork of a bicycle or on the rear frame of a bicycle. An ornamentation 6 is mounted on the hub assembly 2 between the spokes 4 as depicted. The ornamentation 6 is rotatably mounted on the hub assembly 2 so that the ornamentation 6 is able to rotate about the hub assembly 2 as discussed herein.

FIG. 2 is a cross-sectional side view of a wheel assembly according to one embodiment of the present invention. The wheel assembly 1 in FIG. 2 includes an axle 5 and a hub assembly 2 that includes a spindle 7 and hub 8. As depicted, the opposite ends of the axle 5 extend outward the hub assembly 2 so that the wheel assembly 1 can be mounted to the frame of a bicycle in a conventional manner. The spindle 7 and hub 8 are centrally positioned on the axle 5 so that the end 9 of the spindle 7 is received in a stepped portion 10 of the central bore 11 formed in the hub 8. The spindle 7 and hub 8 are held in the position depicted in FIG. 2 by nuts 12 and jam nuts 13 that are received on the outer threaded surface of the axle 5. Rotation of the hub assembly 2 about axle 5 is assisted by bearing 14 which is received in a stepped bore 15 formed in the outer end of spindle 7 and by bearing 16 which is receive in stepped bore 11 formed in the outer end of hub 8. Bearings 14 and 16 are held in position by nuts 12 and optional washers which are not shown.

The wheel assembly 1 includes a circular rim 3 upon which a tire 19 is mounted. The rim 3 is coupled to the wheel assembly 2 by a plurality of spokes 4 in a known manner. The spokes 4 extend on one side between the rim 3 and a spoke flange 20 that is provided on spindle 7 and on the other side between the rim 3 and a spoke flange 21 that is provided on the hub 8. The spokes 4 can be aligned in any known manner including the alignment depicted in FIG. 1.

FIG. 2 includes one ornamentation 6 that is coupled to a support 22 that is rotatably mounted on hub assembly 2 on a pair of bearings 23 and 24. The support 22 includes an annular portion or collar 25 and a flange 26 to which ornamentation 6 can be attached. In the embodiment of the invention depicted in FIG. 2, the ornamentation 6 is attached to the flange 26 of support 22 by threaded members 27. In the embodiment of the invention depicted in FIG. 2, the ornamentation 6 is attached to one end of the support 22. In alternative embodiments the ornamentation 6 can be attached to a central portion of support 22. In further embodiments, more that one ornamentation 6 can be attached to the support 22, or multiple supports could be used.

Although FIG. 2 depicts the use of threaded members 27 to attach the ornamentation 6 to support 22, it is within the scope of the present invention to attach the ornamentation(s) to the support(s) using any manner of mechanical means such as inter-engaging and/or interlocking structural features or auxiliary clips, fasteners etc., magnets, chemical means such as glues, cements, adhesives, epoxies, etc., magnetic attraction, and/or welding techniques. Alternatively, the ornamentation(s) and support(s) could be formed as integral structural element(s).

The position of the support 2 along the hub assembly 2 can be maintained by providing any combination of abutting structures and/or spacers. In the embodiment of the invention depicted in FIG. 2, a spacer 30 is provided between the bearings 23 and 24, and the bearings 23 and 24 and spacer 30 are held within a through-bore 31 of support 22 by a radially inwardly projecting flange 32 formed on one end of the through-bore 31 and by an abutting portion 33 of the ornamentation 6 on the other end. Bearing 23 abuts against a stepped portion 10 of the hub assembly 2 and bearing 24 abuts against spacer 36 which is held in position by hub 8.

It is to be understood that the support 22 can be rotatably mounted to the hub assembly 2 using any suitable type of bearing/bearings and that various combinations of abutting structures, spacers, collars, stops, etc. can be used to maintain the support 22 in a desired position along the hub assembly 2. It is moreover within the scope of the present invention to include two or more supports in a single wheel assembly.

The maximum diameter of the ornamentation 6 is less than the inner diameter of the rim 3 in order to allow the ornamentation 6 to rotate within the rim 3. In alternative embodiments of the present invention it is possible to attach additional continuous or discrete ornamentations to the inner portion of the rim 3 which project inwardly. Such rim-mounted ornamentations can extend radially inwardly adjacent either or both sides of hub-mounted ornamentations. Alternatively, the rim-mounted ornamentations can be aligned axially with the hub-mounted ornamentations.

FIG. 3 is an exploded view of the wheel assembly of FIG. 2. FIG. 3 provides a better illustration of the shape of the components depicted in FIG. 2 and the manner in which they are assembled in FIG. 2. The manner in which the bearings 23 and 24 and spacer 30 are received in the through-bore 31 of support 22 can be seen in FIG. 3. The through-bore 31 has a radially inwardly projecting flange 32 formed on one end which flange 32 prevents the bearings 23 and 24 and spacer 30 from passing completely therethrough. The bearings 23 and 24 and spacer 30 are placed in through-bore 31 from the opposite side of the support 2 and then the ornamentation 6 is attached to flange 26 of support 22 by threaded members 27. The resulting sub-assembly can be slid over the inner end of spindle 7 until the leading bearing 23 abuts stepped portion 35 of spindle 7.

Next, spacer 36 can be slid over the inner end of spindle 7 until the leading end of spacer 36 contacts bearing 24. Next, the hub 8 can be slid over the inner end of spindle 7 and the resulting assembly can be placed on axle 5 with bearings 14 and 16 therebetween and held together by nuts 12 and jam nuts 13. The rim 3 can be coupled to the spoke flanges 20 and 21 by spokes 4 in a conventional manner.

FIGS. 2 and 3 depict one embodiment of a rear wheel hub assembly for a bicycle. It is to be noted that the present invention is not limited to the particular hub assembly which is depicted in FIGS. 2 and 3 for illustrative purposes. The present invention, which is directed to ornamentations which are rotatably mounted on wheel hubs, is applicable to any type of wheel hub assembly. In this regard, as discussed above, the support(s) can be configured and provided with suitable bearings and/or spacers as needed to be rotatably mounted and positioned on the hub assembly of all types of spoked wheel assemblies and other wheel assemblies that include wheel hubs.

FIGS. 4a–4l are planar side views of several different wheel ornamentations according to the present invention. In general, each of the wheel ornamentations depicted in FIGS. 4a–4l includes a planar disc shaped structure so that the edge views are not needed for a complete understanding. In some cases, three-dimensional, non-flat or non-planer shapes can be utilized so long as the thicknesses are compatible with the clearance between the spokes of a wheel assembly or the structure, e.g., fork or frame element used to mount the wheel to a bicycle or other vehicle. For planar ornamentations, the thickness can be from paper thin up to the maximum clearance determined by a wheel assembly. In general, the ornamentations can have a thickness of from about 0.5 mm to about 60 mm for a bicycle wheel. As noted above, the ornamentations of the present invention can be made from a variety of materials such as plastic materials, metals and metal alloys, paper, fiberglass, composites, laminates, wood, etc. Moreover, the wheel ornamentations be transparent, translucent, opaque, solid, perforated in any desired pattern, unitary, multi-component, flat, concave, convex, have complex three-dimensional faces, circular, square, polygonal, star-shaped, propeller-shaped, blade-shaped or have any geometric, symbol or compound or complex geometry desired.

Figure 4A:
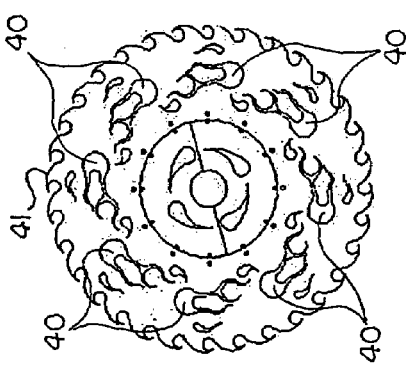
FIGS. 4a–4l are planar side views of several different wheel ornamentations according to the present invention.

FIG. 4a depicts an ornamentation that has flame-shaped cuts-outs 40 and a flame-shaped peripheral edge 41.

Figure 4B:
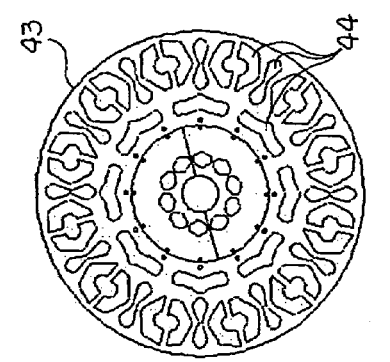

FIG. 4b depicts an ornamentation that has a circular peripheral edge 43 and a repeating pattern of various shaped cut-out areas 44.

Figure 4C:
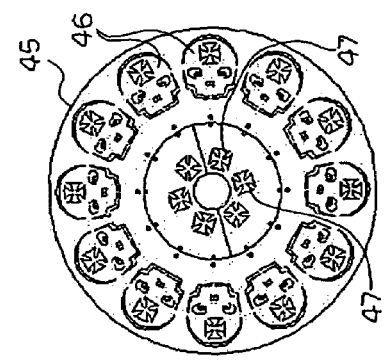

FIG. 4c depicts an ornamentation that has a circular peripheral edge 45 and a cut-out pattern of skulls 46 and iron crosses 47.

Figure 4D:
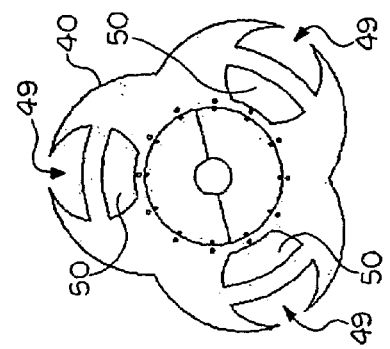

FIG. 4d depicts an ornamentation that has a non-circular peripheral edge that is formed by a series of compound circular sections 48 with cut-out edge portions 49 and inner cut-out portions 50.

Figure 4E:
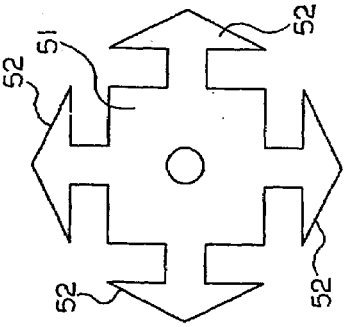

FIG. 4e depicts an ornamentation that has a square central portion 51 and a series of outwardly projecting arrow shapes 52.

Figure 4F:
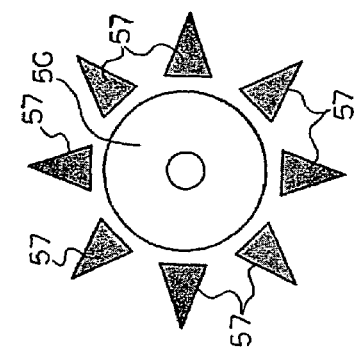

FIG. 4f depicts an ornamentation that has a crossed, four-pointed star pattern having first and second stars 54 and 55 that have different colors or finishes.

Figure 4G:
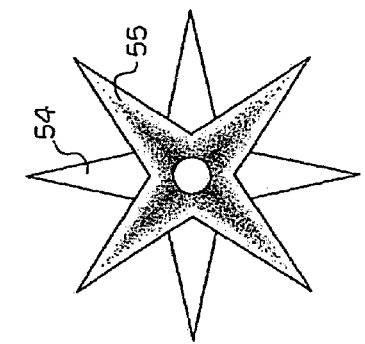

FIG. 4g depicts an ornamentation that has a sun-burst shape that includes a central circular portion 56 and a series of triangular projections 57 that radially extend outward from the central portion 58.

Figure 4H:
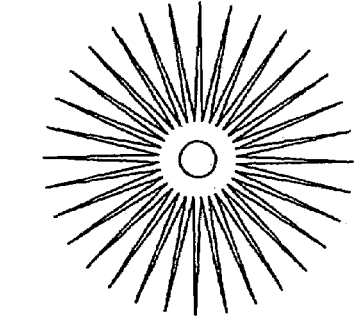

FIG. 4h depicts an ornamentation that has a multi-pointed burst shape.

Figure 4J:
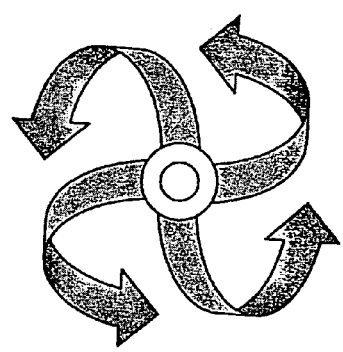
Figure 4L:
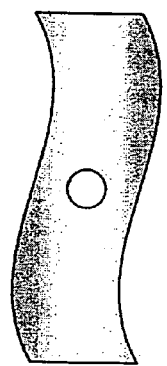
Figure 4I:
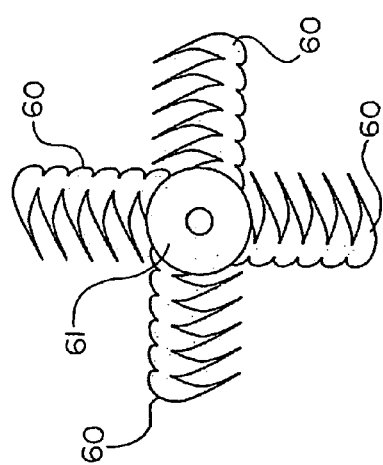

FIG. 4i depicts an ornamentation that has a series of comb or rake structures 60 that project radially outward from a central portion 61.

FIG. 4j depicts an ornamentation that has a multiple, curved arrow shape.

Figure 4K:
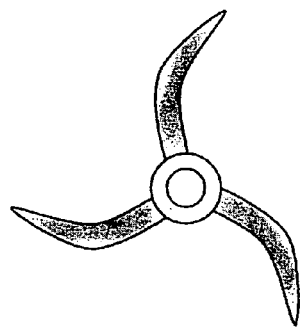

FIG. 4k depicts an ornamentation that has a three-pointed propeller shape.

FIG. 4l depicts an ornamentation that has a curved blade shape.

It is noted that the ornamentations depicted in FIGS. 4a–4l are only exemplary of the unlimited number of patterns which can be used for the ornamentations of the present invention. It is further noted that the illustrated patterns and others can either be shape patterns of the ornamentations or art design patterns that can be printed on, etched in or otherwise applied or provided on solid and/or shaped ornamentations.

Figure 5B:
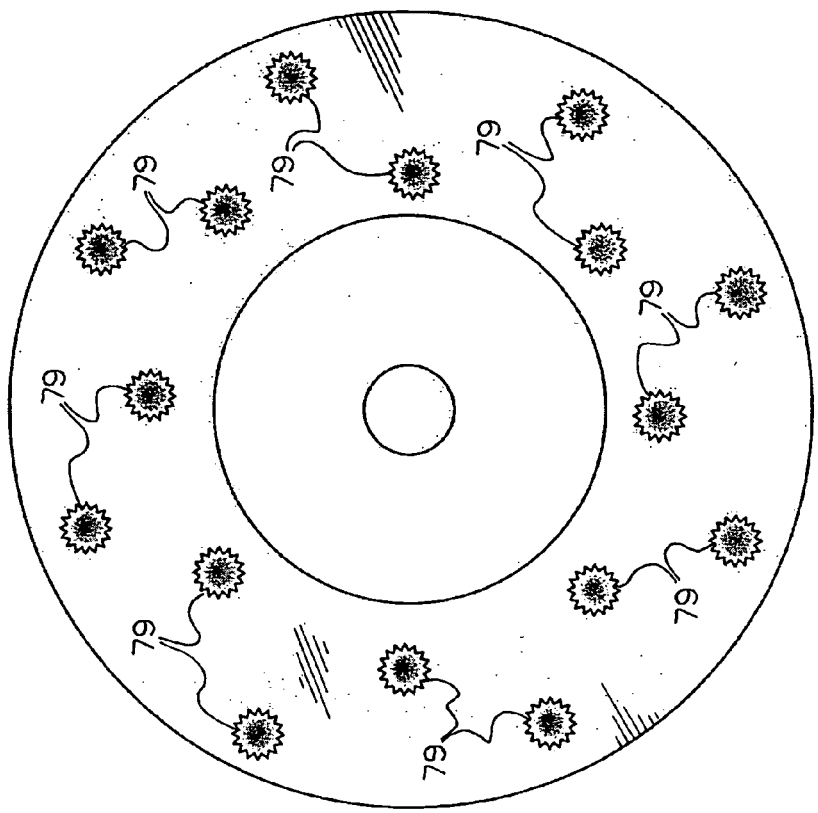
FIG. 5b is a side view of an ornamentation that includes light generating elements thereon according to another embodiment of the present invention.
Figure 5A:
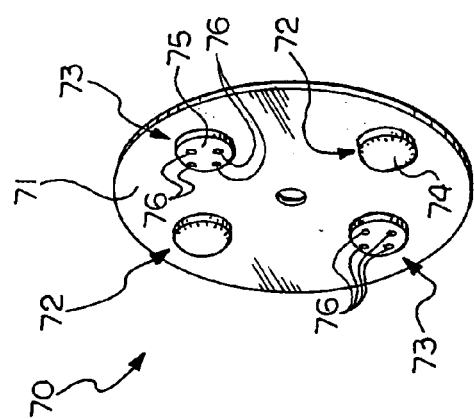
FIG. 5a is a perspective view of an ornamentation that includes light generating elements thereon according to one embodiment of the present invention.

FIG. 5a is a perspective view of an ornamentation that includes light generating elements thereon according to one embodiment of the present invention. The ornamentation 70 depicted in FIG. 5a is a solid planar disc 71 to which a plurality of light generating devices 72 and 73 are attached. The light generating devices can be lenses 74 beneath which one or more battery powered lights are provided and/or a cover 75 having a pattern of battery powered lights 76 visible thereon or therein. The lenses 74 and/or covers 75 extend over bases 77 to form a housing or compartment that houses a battery. A manual or motion switch can be provided to actuate the lights. The light generating elements can be attached to the ornamentation 70 by any suitable mechanical means such as inter-engaging and/or interlocking structural features or auxiliary clips, fasteners etc., magnets, chemical means such as glues, cements, adhesives, epoxies, Velcro®, etc.

FIG. 5b is a side view of an ornamentation that includes light generating elements thereon according to another embodiment of the present invention. The light generating elements in FIG. 5b are individual lights 79 that can be individually powered by separate batteries or can be wired together in one or more groups to a common battery. The lights 79 can be integrally molded into a laminated disc or otherwise attached to the surface of a disc.

Figures 6A, 6B, 6C:
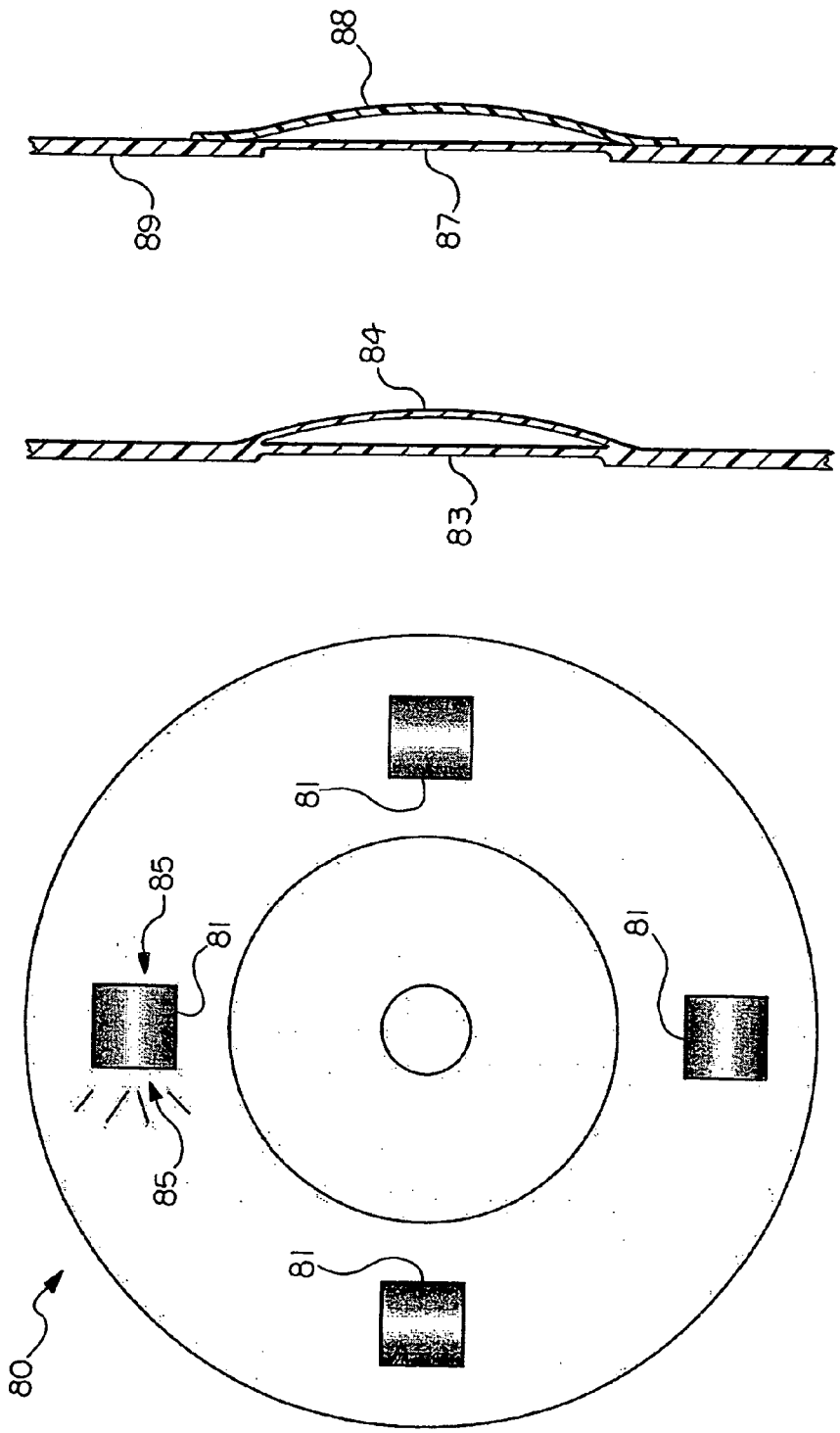
FIG. 6a is a side view of an ornamentation that includes a noise generating structure according to one embodiment of the present invention.
FIG. 6b is a cross-sectional view of an ornamentation that includes a noise generating structure according to one embodiment of the present invention.
FIG. 6c is a cross-sectional view of an ornamentation that includes a noise generating structure according to another embodiment of the present invention

FIG. 6a is a side view of is an ornamentation that includes a noise generating structure according to one embodiment of the present invention. The ornamentation 80 depicted in FIG. 6a includes integrally formed structures 81 that, when exposed to a stream of air, generate an audible noise. Such noise generating structures 81 can be provided in any desired pattern about the ornamentation and can be individually configured to produce a desired sound, such as a single note or plurality of notes, including a chord.

FIG. 6b is a cross-sectional view of the ornamentation of FIG. 6a that includes a noise generating structure according to one embodiment of the present invention. The noise generating structure depicted in FIG. 6b is an integral structure that includes two thin webs 83 and 84 which are spaced slightly apart with openings 85 on either end (FIG. 6a). As air passes through the noise generating structure, the webs 83 and 84 act like reeds and vibrate so as to make noise. The sound generating structure can be made of a thin plastic material.

FIG. 6c is a cross-sectional view of an ornamentation that includes a noise generating structure according to another embodiment of the present invention. The sound generating structure of FIG. 6c is substantially similar to that of FIG. 6b, the difference being that rather than being a complete integral structure the sound generating structure of FIG. 6c includes one web member 87 that is integral with the disc 89 and one web member 88 that is a separate element that is secured onto the disc 89.

It is to be understood that there are numerous noise generating structures that are commonly used for toy whistles and toy instruments that can be used in conjunction with the wheel ornamentations of the present invention and therefore the structures illustrated in FIGS. 6a–6b are understood to be non-limiting examples only.

Figure 7B:
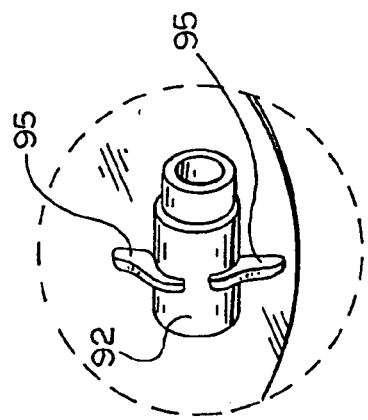
FIG. 7b is a sectional view of a removable/replaceable noise generating article according to one embodiment of the present invention.
Figure 7A:
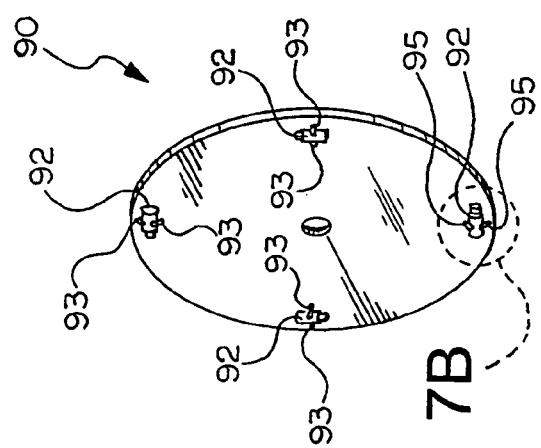
FIG. 7a is a perspective view of an ornamentation that includes a removable/replaceable noise generating article according to one embodiment of the present invention.

FIG. 7a is a perspective view of an ornamentation that includes a removable/replaceable noise generating article according to one embodiment of the present invention. The ornamentation 90 depicted in FIG. 7a includes a planar disc 91 to which noise generating articles such tubular whistles 92 can be removably/replacably attached by docking structures 93 that can be in the form of biased clips, magnetically attachable sites, Velcro®, etc. The noise generating articles 92 can be configured and designed so that they generate noise when the ornamentation rotates about a wheel hub and when the noise generating articles 92 are removed and a person blows through the noise generating articles 92.

FIG. 7b is a sectional view of one of the removable/replaceable noise generating articles of FIG. 7a. As shown in FIG. 7b, the tubular shaped noise generating article 92, e.g. a whistle, is secured by a pair of biased clips 95 to the surface of disc 91. In the illustrated embodiment the tubular shaped noise generating article 92 can be slid in between the clips 95, on in an alternative embodiment, the clips 95 could easily be configured so that the noise generating article 92 could be "snapped" between the clips 95.

In addition, or in an alternative to having removable/replaceable sound generating articles, the ornamentations of the present invention can have removable/replaceable light generating devices such as small battery operated flash nights. In addition, electronic or wind-up noise generating devices could be provided that are removably attachable or permanently attached to the ornamentations.

In further embodiments, kinetic components that have moving parts can be attached and otherwise incorporated into the ornamentations. For example, rotating or spinning or sliding elements can be coupled to the ornamentations, including, for example, smaller rotating ornamentations, and sliders and rollers such as spheres that move along slots.

It is to be understood that the various embodiments of the ornamentations discussed above could be used in any desired combination. For example, various noise generating articles/devices/structures could be used in combination with various light generating devices/elements and such combinations could be used with ornamentations that have any desired shape, including ornamentations that have cut-outs therein.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

What is claimed is:

1. A wheel assembly which comprises:
    a wheel hub assembly which comprises a spindle having a cylindrical outer surface and a hub coupled to the spindle;
    a single axle that extends through the hub assembly;
    a rim mounted on the wheel hub assembly by a plurality of spoke members, the rim having a diameter;
    a support rotatably mounted exclusively on the cylindrical outer surface of the spindle of the wheel hub assembly for independent rotation with respect to the wheel hub assembly, the support having a continuous cylindrical collar and a radially extending flange; and
    at least one ornamentation having a diameter which is smaller than the diameter of the rim, the at least one ornamentation being coupled to the radially extending flange of the support and positioned between axially adjacent ones of the plurality of spoke members.

2. A wheel assembly according to claim 1, wherein the at least one ornamentation comprises a disc.

3. A wheel assembly according to claim 2, wherein the disc is flat.

4. A wheel assembly according to claim 2, wherein the disc is substantially circular.

5. A wheel assembly according to claim 4, wherein the disc is circular.

6. A wheel assembly according to claim 2, wherein the disc has a plurality of cut-out portions formed therein.

7. A wheel assembly according to claim 4, wherein the disc has a plurality of cut-out portions formed therein.

8. A wheel assembly according to claim 2, further comprising at least one light generating element provided on the disc.

9. A wheel assembly according to claim 8, wherein the at least one light generating element is removable provided on the disc.

10. A wheel assembly according to claim 2, further comprising at least one noise generating element provided on the disc.

11. A wheel assembly according to claim 10, wherein the at least one noise generating element is removable provided on the disc.

12. A wheel assembly according to claim 10, wherein the at least one noise generating element is formed integrally in the disc.

13. A wheel assembly according to claim 2, wherein the at least one ornamentation comprises two or more discs.

14. A wheel assembly according to claim 1, wherein the wheel assembly comprises a bicycle wheel.

15. A wheel assembly according to claim 14, wherein the bicycle wheel comprises a rear bicycle wheel.

16. A wheel assembly according to claim 14, wherein the bicycle wheel comprises a front bicycle wheel.

17. A wheel assembly according to claim 2, wherein the at least one ornamentation compromises artwork.

18. A wheel assembly according to claim 2, wherein the at least one ornamentation is made from at least one of plastic materials, metals and metal alloys, paper, fiberglass, composites, laminates, wood and combinations thereof.

19. A wheel assembly according to claim 2, wherein the disc is non-circular.

20. A wheel assembly according to claim 2, wherein the disc is substantially asymmetrical.

* * * * *